United States Patent [19]

Harris et al.

[11] Patent Number: 5,732,124
[45] Date of Patent: Mar. 24, 1998

[54] APPARATUS AND METHOD FOR DETECTING THE STATUS OF A PCM CHANNEL

[75] Inventors: Joseph L. Harris, Athens; David Paul Nelson, Huntsville, both of Ala.

[73] Assignee: Motorola, Inc., Schaumburg, Ill.

[21] Appl. No.: 577,582

[22] Filed: Dec. 22, 1995

[51] Int. Cl.⁶ .................................................. H04K 1/00
[52] U.S. Cl. .......................... 379/23; 379/350; 370/241; 370/522; 375/228
[58] Field of Search ................................... 375/224, 228, 375/254, 246, 242; 370/241, 242, 522; 379/350, 351, 352, 353, 359, 360, 361, 22, 23, 32

[56] References Cited

U.S. PATENT DOCUMENTS

| | | |
|---|---|---|
| 4,477,900 | 10/1984 | Gruenberg . |
| 4,805,171 | 2/1989 | Ewell . |
| 4,928,306 | 5/1990 | Biswas et al. ............... 370/522 |
| 5,007,050 | 4/1991 | Kasparian et al. ........... 370/366 |
| 5,598,401 | 1/1997 | Blackwell et al. ........... 379/94 |

*Primary Examiner*—Wellington Chin
*Assistant Examiner*—Jean B. Corrielus
*Attorney, Agent, or Firm*—Nancy R. Gamburd

[57] ABSTRACT

An apparatus and method are provided for determining the activity status of a PCM channel in a telecommunications system. The method (600–680) and apparatus (400) utilize a codec (220) within the PCM channel which converts an analog signal to a digital signal and converts a digital signal to an analog signal. Within the apparatus (400), a memory register (402) is coupleable to the codec (220) to repeatedly obtain and store a digital byte of a plurality of digital bytes from the PCM channel. A processor (404) coupled to or containing the memory register (402) repeatedly, for a predetermined period of time, determine whether an ordered arrangement of bits of a digital byte has a predetermined bit pattern and accumulate a count of digital bytes having the predetermined bit pattern. The processor (404) then determines whether the accumulated count is greater than a predetermined value and provides a notification indicating the status of the PCM channel.

30 Claims, 2 Drawing Sheets

APPARATUS AND METHOD FOR DETECTING THE STATUS OF A PCM CHANNEL

FIELD OF THE INVENTION

This invention relates in general to communications systems and devices, and more specifically, to an apparatus and method for determining the status of a PCM channel

BACKGROUND OF THE INVENTION

In most telecommunications systems, such as the public switched telephone network ("PSTN"), the information transmitted from and received at the end points of a connection is typically in the form of an analog signal, such as that which may be received from or transmitted to a telephone. When the analog signal is transferred over a telecommunications system, for example, at the central (switching) office of the telecommunications network provider, the analog signal may be converted to a digital signal and transmitted in the form of digital data. This conversion is usually accomplished using a coder-decoder commonly referred to as a "codec", which converts an analog signal to a digital signal using known pulse code modulation (PCM) techniques, such as those described in F. Owen, *PCM and Digital Transmission Systems*, (McGraw-Hill, 1982), and other numerous telecommunications publications. Accordingly, in many if not most telecommunications systems, an analog signal is typically transmitted within the system as a PCM or other digital signal over a PCM or other digital channel.

As a consequence of this widespread use of PCM in telecommunication systems and networks, the status of a PCM channel (whether the channel is active or inactive) within the system or network is important, allowing the service provider to efficiently allocate the telecommunications system resources. For example, it is highly inefficient for a PCM channel to be connected without useful activity occurring, such as data or voice transmission. In addition, in such circumstances, the channel is not available for actual use in data or voice transmission. Such circumstances may occur when a PCM channel has been accessed (or connected) and unintentionally remains connected because of an invalid signaling status. In other words, it may be placed in active status (taken off hook or connected) and unintentionally remains in active status although no information (voice or data) is transferred on the PCM channel.

The status (active or inactive) of a connected PCM channel may be determined in the prior art by using an analog circuits and analog techniques. These analog techniques typically require the use of an additional codec for converting the digital signal to an analog signal, and may also require other analog components (such as a peak detector and a comparator) to process the analog signal to determine PCM status. Depending on the sampling rates and characteristics of the components, it may be possible for the analog components used with these analog techniques to be shared with other analog systems.

Another prior art method examines the analog signals transmitted to and received from the codec in the telecommunications system. Although this method does not require an additional codec, it typically requires additional analog switches and some type of multiplexing in order to reduce the number of monitoring units. While this method does not directly monitor the digital signals of the codec, the occurrence of an analog signal (having a sufficient power level) on either the transmit or receive side of the codec is used to indirectly detect the status of the PCM channel. This method, however, also requires the additional components mentioned above, increasing the complexity and cost of the telecommunications system.

Accordingly, a need has remained for an apparatus and method to reliably detect PCM channel status, especially in the event that the channel is unintentionally inactive, and to perform such detection efficiently and with minimal complexity. In addition, a need has remained for such an apparatus and method to readily adapt to different types of PCM codecs, to utilize equipment having a low cost and power requirements, and to be readily installable in a telecommunications system.

DETAILED DESCRIPTION OF THE INVENTION

Figure 1:
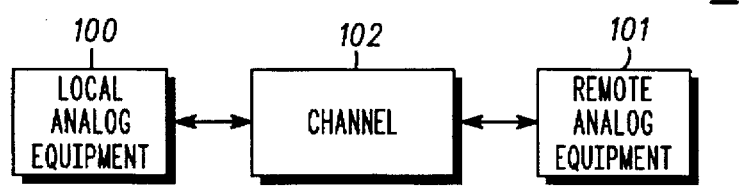
FIG. 1 is a block diagram illustrating a communications system.

FIG. 1 is a block diagram illustrating a communications system 10. The communications system 10 includes local analog equipment 100, such as an analog telephone, analog modem or other analog device, coupled to a communications channel 102, such as a public switched telephone network ("PSTN"), a private network, a combination thereof or another, equivalent network. The local analog equipment 100 and the remote analog equipment 101 may each transmit and receive analog information, to and from the other, over the communications channel in a full duplex (two-way) communications connection. As mentioned above, when the analog information from either or both the local analog equipment 100 and/or the remote analog equipment 101 is transmitted on the communications channel 102, the analog information may be converted to a digital format, typically using known techniques such as PCM.

Figure 2:
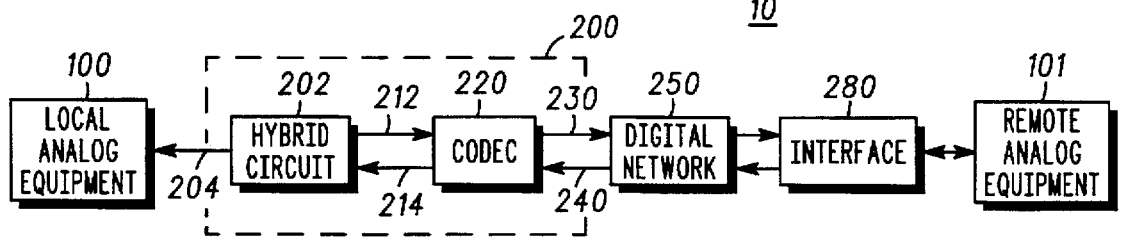
FIG. 2. is a block diagram illustrating interface circuitry utilized to connect analog equipment to a digital network.

FIG. 2. is a block diagram illustrating interface circuitry 200 and 280 utilized to connect analog equipment 100 and 101 to a digital network 250. The interface circuitry 200 (and 280, although not separately illustrated) includes a known hybrid circuit 202, which is used to convert a two-wire (2W) (twisted pair) line 204 from the analog equipment to a four-wire (4W) line having a transmit pair of wires, line 212 and a receive pair of wires, line 214. The transmit pair 212 couples an analog transmit signal from the hybrid circuit 202 to a codec 220, and the receive pair 214 couples an analog receive signal from the codec 220 to the hybrid circuit 202. Also as known in the art, the codec 220 converts the analog transmit signal to a digital signal for transmission, and converts a received digital signal (from the digital network 250) to an analog receive signal, utilizing an analog-todigital ("A/D") converter. Because a linear ND conversion may not provide sufficient dynamic range, either a μ-law compandor or an A-law compandor is typically used in the analog-digital conversion process. In North America and Japan, a μ-law codec is the standard, whereas in a large part of the rest of the world, an A-law codec is the standard. After the codec 220 converts the analog transmit signal to a digital transmit signal, the digital transmit signal is coupled to the digital network 250 via some type of connection such as transmit connection 230. A digital receive signal is coupled from the digital network 250 via a connection such as receive connection 240, and converted to an analog receive signal by the codec 220 and coupled to the hybrid circuit 202 via receive pair 214. As mentioned above, the communication system 10 has another interface circuit 280, essentially identical to interface circuit 200, to perform the same analog-digital conversions between the digital network 250 and the remote analog equipment 101.

Typical codecs, such as the codec 220, have a sampling rate of 8,000 samples per second, having an equivalent sampling period (reciprocal of the sampling rate) of 125 microseconds. Each digital sample of an analog signal is usually represented by a byte in accordance with the type of codec (μ-law or A-law PCM), with each byte consisting of an ordered grouping or arrangement of eight bits. (Equivalently, each digital sample could be represented by additional bits, such as a 16 bit word, or fewer bits, depending upon the chosen dynamic range.) The ordered group of eight bits of the byte representing the analog signal are referred to as $b_7, b_6, \ldots, b_0$, in which the seventh bit $b_7$ is the most significant bit and is usually a sign or polarity bit in PCM encoding, the sixth bit $b_6$ is the next most significant bit, and so on, with the least significant bit being the zeroth bit $b_0$.

Figure 3:
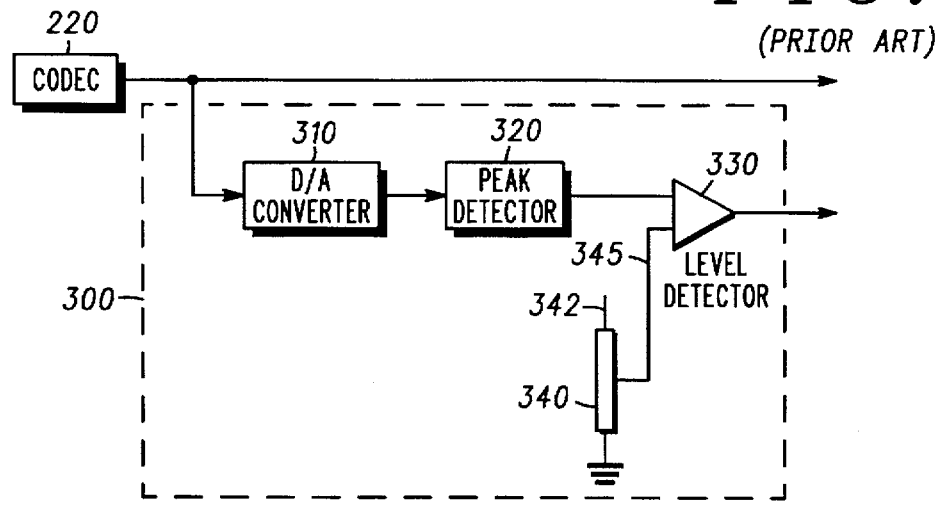
FIG. 3 is a block diagram illustrating a prior art apparatus for determining codec status.

FIG. 3 is a block diagram illustrating a prior art apparatus 300 for determining codec activity in order to determine the status of a PCM channel. Such prior art devices typically convert (or reconvert) a digital signal to an analog signal, and then utilize a peak detector or a differential detector to determine whether the analog signal is above a certain threshold level and, if so, PCM activity is assumed. In addition, these prior art analog devices are also utilized in other systems, which may not necessarily be digital, such as voice operated transmission systems like speakerphones, which mute the speaker when an individual is talking above a certain level. As illustrated in FIG. 3, a digital transmit signal (as a sampled byte) from a codec 220 is coupled to a converter 310, such as an ND converter having the same functionality as a codec, which converts the digital transmit signal to an analog signal. Peak detector 320 is coupled to the converter 310 and receives the analog signal, which is peak detected, typically producing an envelope signal. The envelope signal is coupled to a level detector 330 and compared to a threshold voltage (on line 345) in the level detector 330. When the envelope signal exceeds the threshold voltage, a status signal is generated (indicating activity) by the level detector. The threshold voltage may be produced by, for example, a fixed voltage source 342 and a voltage divider 340. Different values of the threshold voltages permit the level detector 330 to be triggered at different levels, thereby producing a status signal for a range of values of the digital transmit signal.

Figure 4:
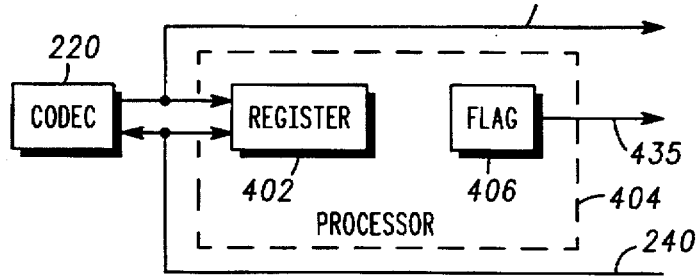
FIG. 4 is a block diagram illustrating a first embodiment of an apparatus for detecting codec status and PCM channel status in accordance with the present invention.

FIG. 4 is a block diagram illustrating a first embodiment of an apparatus for detecting codec status and PCM channel status in accordance with the present invention. In the preferred embodiment, the apparatus is embodied in a processor (or microprocessor), such as an Intel 8031, or as part of a controller, such as in a Motorola DAS925 having a DVP2W card and DVP4W card. With most PCM channels, a processor is readily available within the communications system and is used, for example, for PCM gain adjustment, digital filtering, signaling, and multiplexing. The processor or controller for implementing this first embodiment of the present invention may be incorporated within such a communications system and may be programmed with a set of instructions which, when executed, carry out the methodology of the present invention, as explained in greater detail below.

Referring to FIG. 4, from the codec 220 utilized to convert an analog signal to a digital signal for transmission over the digital network 250 (illustrated in FIG. 2), both the digital transmit signal and the digital receive signal are respectively coupled on lines 230 and 240 to a memory register (or register) 402 within a processor 404. Utilizing both the digital transmit signal and digital receive signal is preferred because transmit and receive channels may alternate activity in some applications; for example, in a voice connection, each transmit and receive line may have activity approximately 50% of the time, as one person may be speaking while the other is listening. The processor 404 examines the digital transmit and receive signals, held as bytes in register 402, each byte an ordered groups of 8 bits, to determine PCM channel activity. Each byte may be examined in a serial or a parallel manner, with a specific bit or specific groupings or patterns of bits examined to determine PCM activity in accordance with the present invention. In the preferred embodiment, the bits are examined in parallel, utilizing any appropriate parallel bus available in the processor, and preferably utilizing a bit test functionality also available in most processors. In the preferred embodiment, as explained in greater detail below, depending upon the anticipated noise level or noise threshold of the PCM channel, certain bits or combinations of bits are examined which correspond to the amplitude of the analog signal being converted to a PCM encoded digital signal. If an analog signal is present which is greater than a predetermined level of noise, with PCM encoding, the corresponding bits or combinations of bits should have certain values or predetermined patterns, as explained in greater detail below. If these values or patterns persist on average (or at a predetermined average level) for a predetermined period of time, then it is highly likely (if not certain) that there is corresponding PCM activity.

In the preferred embodiment, a noise threshold was empirially determined to be $\frac{1}{32}$ of the maximum amplitude of an analog signal. Corresponding to the coding methodology for μ-law and for A-law PCM, an analog signal has an amplitude greater than or equal to this $\frac{1}{32}$ level if the sixth bit of the ordered bits of the signal byte is a binary zero (μ-law) or a binary one (A-law). In the preferred embodiment illustrated in FIG. 4, the processor 404 examines the sixth bit held in the register 402, for each of the receive and transmit signals which, as mentioned above, are sampled at a rate of 8000 samples/second. If the sixth bit of the signal byte is equal to binary "0" (for a μ-law codec), on average, for a predetermined period of time, then a status flag 406 in the processor 404 is set to binary "1" to indicate that the PCM channel is active. When the status flag 406 is "1", then either the digital transmit signal or the digital receive signal is representing an analog signal having an amplitude level greater than the predetermined noise level of the analog line. Correspondingly, when an A-law codec is used to generate the PCM signal, the status flag 406 of the processor 404 is set to binary 1 when the sixth bit of the signal byte is a binary "1", on average, for a predetermined period of time. In the preferred embodiment, the status flag 406 is also contained in a memory register within the processor 404.

Other bits or combinations of bits of the ordered bits of the receive and transmit signal bytes may also be examined, depending upon the desired noise threshold. For example, for a μ-law codec, should the noise threshold be set at 1/128 of the maximum amplitude of an analog signal, then the sixth bits and the fifth bits should be examined, with the sixth bit equal to binary 1 and the fifth bit equal to a binary zero, or with the sixth bit equal to binary 0 (and the fifth bit equal to a binary zero or one), on average, for a predetermined period of time. Similarly, for a μ-law codec, should the noise threshold be set at 1/64, then the sixth, fifth and fourth bits should be examined, also with the sixth bit equal to binary 1 and the fifth and fourth bits equal to a binary zero, or with the sixth bit equal to binary 0 (and the fifth and fourth bits equal to either a binary zero or one) on average, for a predetermined period of time. Corresponding bits may also be similarly examined for an A-law codec, with corresponding noise thresholds.

As mentioned above, amplitude values of the analog signal will tend to vary over time, with periods of activity such as speaking (for voice communication), followed by periods of quiescence, such as listening. This variance in activity levels will be reflected in the corresponding PCM digital encoding. Accordingly, there may be periods of time during which the PCM channel does not have activity levels above the threshold noise level even though the channel is active, for example, while neither party is speaking in a voice communication. As a consequence, in the preferred embodiment, the activity levels indicated by, for example, the sixth bit, is averaged over a period of time to determine PCM channel activity. Depending upon the application, such as voice, data, or video, for example, threshold activity levels, as bit averages over time, may be determined empirically. For example, for a voice application, the service provider may desire to examine the sixth bit for a ten second period of time, with a determination of PCM activity made when the sixth bit is equal to zero an average of eight out of ten samples, with sampling occurring at a rate of 8000 samples/second.

Figure 5:
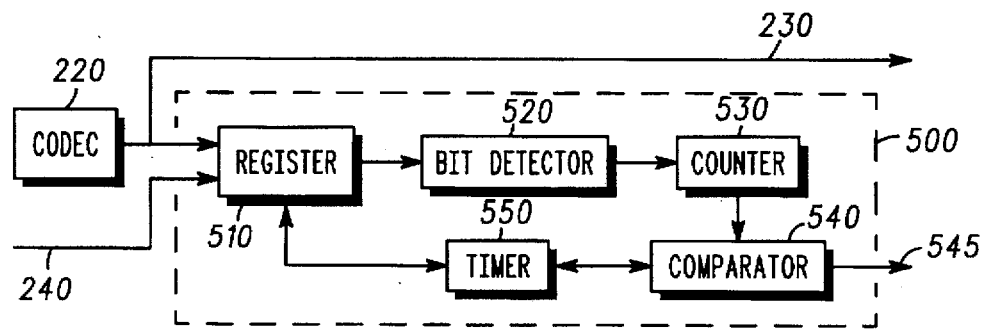
FIG. 5 is a block diagram illustrating functional blocks of a second embodiment of an apparatus for detecting codec status and PCM channel status in accordance with the present invention

FIG. 5 is a block diagram illustrating functional blocks of a second embodiment of an apparatus for detecting codec status and PCM channel status in accordance with the present invention. The apparatus may also be embodied in a processor (or microprocessor), such as an Intel 8031, or as part of a controller, such as in a Motorola DAS925 having a DVP2W card and DVP4W card, also containing a corresponding set of program instructions. Transmit and receive PCM channels 230 and 240, respectively, also supply to a processor 500 eight ordered bits, as digital transmit and receive bytes from the codec 220, from the transmit and receive analog signals (also preferably sampled at rate of 8000/sec). Both transmit and receive bytes, eight ordered bits each, are stored in register 510. The register 510 is also typically driven from processor 500 interrupt signals (for synchronization), which may occur every 125 microseconds (and may occur at different times in a time multiplexed system), and is updated at the interrupt rate with new samples or transmit and receive bytes from the codec 220 for a first predetermined period of time (determined by the timer 550, as explained below). The bit detector 520 examines the sixth bit of the sampled byte and, depending on the PCM format type (μ-law or A-law), responds by setting an activity flag to a binary 1 when the sixth bit is a binary 0 (μ-law) or binary 1 (A-law). The counter 530 periodically samples the activity flag from the bit detector 520, typically at the same interrupt rate. Each time the counter 530 detects the activity flag having a binary value of 1, the counter 530 increments a value stored in a register of the counter 530. At a second predetermined period of time determined by the timer 550, typically occurring after a certain number of sampling intervals of the counter 530, a comparator 540 examines the contents of the counter register. As mentioned above, in the preferred embodiment, samples are accumulated for a predetermined period of time, or up to a certain number of samples (which, as periodic samplings, also correspond to a predetermined period of time). If the value stored in the counter register is greater than a stored value (usually predetermined) then a channel status flag (accessed or displayed on line 545) is set to a binary 1, indicating that the PCM channel status is active. If the value in the counter register is less than the stored value, however, the channel status flag is set of a binary zero, indicating that the PCM channel status is inactive and the telecommunications connection may be disconnected. As indicated above, the timer 550 is coupled to the comparator 540 and the memory register 510 to determine a first predetermined period of time during which the memory register repeatedly obtains and stores a digital byte of the plurality of digital bytes from the PCM channel and to determine a second period of time subsequent to which the comparator compares the accumulated count to a threshold value and generates a corresponding channel status flag.

Figure 6:
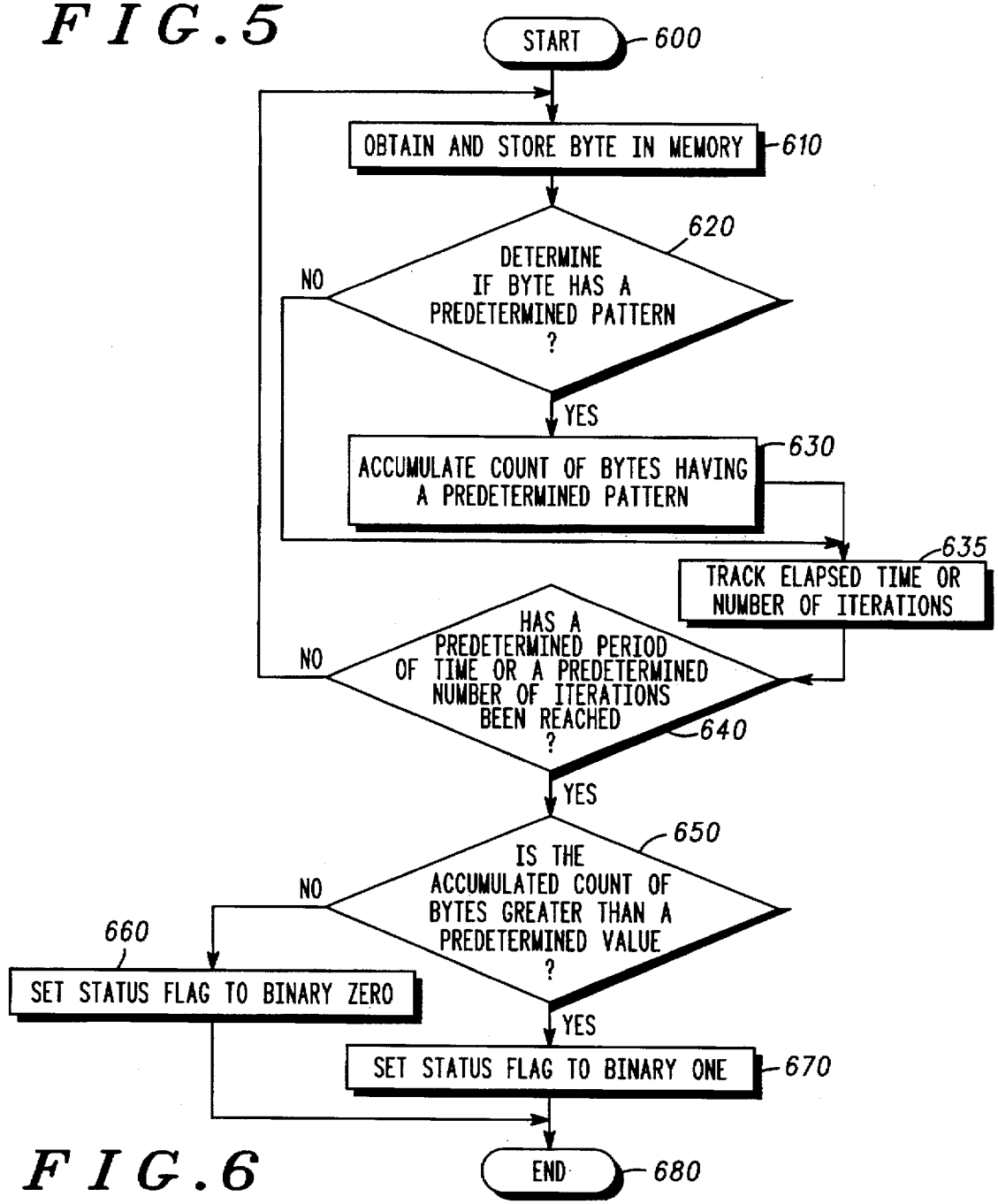
FIG. 6 is a flow diagram illustrating a method embodiment for detecting codec status and PCM channel status in accordance with the present invention.

FIG. 6 is a flow diagram illustrating a method embodiment for detecting codec status and PCM channel status in accordance with the present invention. The method may be implemented as a set of program instructions, which may be executed by a processor, as mentioned above, to determine PCM channel status (active or inactive). Upon starting the method, step 600, bytes from the transmit and receive lines of the PCM channel are obtained and stored in memory, respectively forming a transmit byte and a receive byte, step 610. Next, in step 620, each byte is examined to determine whether it has a predetermined pattern. In the preferred embodiment, the sixth bit of each of the transmit and receive bytes is examined to determine if the sixth bit has a predetermined value (a binary 0 for a μ-law codec or a binary 1 for an A-law codec). As mentioned above, other groupings of bits of the ordered receive and transmit bytes may also be examined. If the byte has the predetermined pattern (such as the sixth bit of the byte having a 0 value for a μ-law codec), a count of such occurrences is accumulated, for example, by incrementing a counter, step 630. Next, in step 635, the elapsed time or the number of iterations (of steps 610 through 640) are tracked, for example, through a timer or through a counter, so that the method will repeat a predetermined number of times or repeat for a certain duration of time, in order to acquire a predetermined number of samples of the transmit and receive bytes to form an average over time. In step 640, the elapsed time or the number of iterations is compared with, respectively, a predetermined period of time or a predetermined number of iterations. If the elapsed time has not reached the predetermined period of time or the number of iterations is less than the predetermined number of iterations in step 640, then steps 610, 620, 630 and 635 are repeated. If the elapsed time has reached the predetermined period of time or the number of iterations has reached the predetermined number of iterations, the accumulated value is compared with a predetermined (or threshold) value, step 650. If the accumulated value exceeds the predetermined or threshold value, a status flag is set to a binary 1 in step 670, indicating that the PCM channel is active (or has an active status). If the accumulated value does not exceed the threshold value, then the status flag is set to a binary 0, step 660, indicating that the PCM channel is inactive (or has an inactive status). The control processor of the communications system may then use the value of the status flag to either maintain the telephone connection or disconnect the connection, and the process ends, step 680.

A major and significant advantage of the present invention is the ease of implementation, as most if not all PCM channels already have both a codec for PCM encoding and a processor utilized for other functions, such as signalling, PCM gain control, and other telecommunications network activities. The method and apparatus of the present invention may then be readily implemented through additional program instructions, without any additional equipment cost or expense. The apparatus and method of the present invention are easily transportable to a variety of processors, and is independent from any signalling status which may or may not be available on PCM channels. This digital methodology and apparatus also has significantly fewer discrete parts than the existing analog apparatus, resulting in significant cost reduction, and increased circuit and detection reliability.

An additional advantage of the present invention is its utilization to increase efficiency in digital telephone switches. By producing an indication of the actual use of a PCM channel, the invention allows more users to obtain service over the same number of channels and reduces wasted transmission capacity by reusing inactive channels.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for detecting the status of a PCM channel in a telecommunications system, the PCM channel having a codec to convert an analog signal to a digital signal and to convert a digital signal to an analog signal, the digital signal having a representation as a plurality of digital bytes, each digital byte of the plurality of digital bytes having an ordered arrangement of bits, the method comprising:

(a) obtaining and storing a digital byte of the plurality of digital bytes from the PCM channel;
   (b) determining whether ordered arrangement of bits of the digital byte has a predetermined bit pattern;
   (c) accumulating a count of the digital bytes having the predetermined bit pattern to form an accumulated count;
   (d) repeating steps (a) through (c), inclusive, for a predetermined period of time;
   (e) subsequent to the predetermined period of time, determining whether the accumulated count is greater than a predetermined value; and
   (f) when the accumulated count is greater than a predetermined value, providing a notification indicating the status of the PCM channel.

2. The method of claim 1, further comprising:
   (g) when the accumulated count is not greater than the predetermined value, resetting the accumulated count to a beginning value.

3. The method of claim 1 wherein the codec is a μ-law codec, and wherein step (b) further comprises:

(b1) determining whether the sixth bit of the digital byte is equal to a binary 0.

4. The method of claim 1 wherein the codec is an A-law codec, and wherein step (b) further comprises:
   (b2) determining whether the sixth bit of the digital byte is equal to a binary 1.

5. The method of claim 1 wherein the predetermined bit pattern is determined according to a noise threshold relative to a maximum amplitude of the analog signal.

6. The method of claim 5 wherein the predetermined bit pattern is determined according to the noise threshold of $1/32$ of the maximum amplitude of the analog signal.

7. The method of claim 5 wherein the predetermined bit pattern is determined according to the noise threshold of $1/64$ of the maximum amplitude of the analog signal.

8. The method of claim 5 wherein the predetermined bit pattern is determined according to the noise threshold of $1/128$ of the maximum amplitude of the analog signal.

9. The method of claim 1 wherein the predetermined period of time is proportional to an integer multiple of a sampling period of the codec.

10. The method of claim 9 wherein the sampling period is 125 microseconds.

11. The method of claim 1 wherein the period of time corresponds to a predetermined number of repetitions of steps (a) through (c), inclusive.

12. The method of claim 1 wherein step (f) further comprises:
   (f1) setting a status flag to a binary 1 when the accumulated count is greater than the predetermined value to indicate that the PCM channel has an active status.

13. The method of claim 1 wherein step (f) further comprises:
   (f2) setting a status flag to a binary 0 when the accumulated count is not greater than the predetermined value to indicate that the PCM channel has an inactive status.

14. An apparatus for detecting the status of a PCM channel in a telecommunications system, the PCM channel having a codec to convert an analog signal to a digital signal and to convert a digital signal to an analog signal, the digital signal having a representation as a plurality of digital bytes, each digital byte of the plurality of digital bytes having an ordered arrangement of bits, the apparatus comprising:

a memory register coupleable to the codec to repeatedly obtain and store a digital byte of the plurality of digital bytes from the PCM channel;

a processor coupled to the memory register, the processor responsive through a set of program instructions to repeatedly for a predetermined period of time to determine whether the ordered arrangement of bits of a digital byte has a predetermined bit pattern and to accumulate a count of digital bytes having the predetermined bit pattern to form an accumulated count; and subsequent to the predetermined period of time, the processor further responsive to determine whether the accumulated count is greater than a predetermined value and when the accumulated count is greater than a predetermined value, to provide a notification indicating the status of the PCM channel.

15. The apparatus of claim 14, wherein the processor is further responsive to reset the accumulated count to a beginning value when the accumulated count is not greater than the predetermined value.

16. The apparatus of claim 14 wherein the codec is a μ-law codec, and wherein the processor is further responsive to determine whether the sixth bit of the digital byte is equal to a binary 0.

17. The apparatus of claim 14 wherein the codec is an A-law codec, and wherein the processor is further responsive to determine whether the sixth bit of the digital byte is equal to a binary 1.

18. The apparatus of claim 14 wherein the predetermined bit pattern is determined by the processor according to a noise threshold relative to a maximum amplitude of the analog signal.

19. The apparatus of claim 18 wherein the predetermined bit pattern is determined by the processor according to the noise threshold of 1/32 of the maximum amplitude of the analog signal.

20. The apparatus of claim 18 wherein the predetermined bit pattern is determined by the processor according to the noise threshold of 1/64 of the maximum amplitude of the analog signal.

21. The apparatus of claim 18 wherein the predetermined bit pattern is determined by the processor according to the noise threshold of 1/128 of the maximum amplitude of the analog signal.

22. The apparatus of claim 14 wherein the predetermined period of time is proportional to an integer multiple of a sampling period of the codec.

23. The apparatus of claim 22 wherein the sampling period is 125 microseconds.

24. The apparatus of claim 14 wherein the period of time corresponds to a predetermined number of repetitions of the processor determining whether the ordered arrangement of bits of a digital byte has a predetermined bit pattern and accumulating a count of digital bytes having the predetermined bit pattern to form an accumulated count.

25. The apparatus of claim 14 wherein the processor is further responsive to set a status flag to a binary 1 when the accumulated count is greater than the predetermined value to indicate that the PCM channel has an active status.

26. The apparatus of claim 14 wherein the processor is further responsive to set a status flag to a binary 0 when the accumulated count is not greater than the predetermined value to indicate that the PCM channel has an inactive status.

27. An apparatus for detecting the status of a PCM channel in a telecommunications system, the PCM channel having a codec to convert an analog signal to a digital signal and to convert a digital signal to an analog signal, the digital signal having a representation as a plurality of digital bytes, each digital byte of the plurality of digital bytes having an ordered arrangement of bits, the apparatus comprising:

a memory register coupleable to the codec to repeatedly obtain and store a digital byte of the plurality of digital bytes from the PCM channel;

a bit detector coupled to the memory register, the bit detector repeatedly generating an activity flag from repeated detection of a sixth bit of the digital byte of the plurality of digital bytes;

a counter coupled to the bit detector to receive and sample the activity flag and to accumulate a count corresponding to the activity flag having a predetermined value to form an accumulated count; and a comparator coupled to the counter to receive the accumulated count and to compare the accumulated count to a threshold value and to generate a corresponding channel status flag.

28. The apparatus of claim 27 further comprising:

a timer coupled to the comparator and the memory register to determine a first predetermined period of time during which the memory register repeatedly obtains and stores a digital byte of the plurality of digital bytes from the PCM channel and to determine a second period of time subsequent to which the comparator compares the accumulated count to a threshold value and generates a corresponding channel status flag.

29. The apparatus of claim 27 wherein the memory register, the bit detector, the counter and the comparator are embodied in a processor.

30. The apparatus of claim 27, wherein the comparator is further responsive to reset the accumulated count of the counter to a beginning value when the accumulated count is not greater than the threshold value.

* * * * *